May 27, 1952      H. E. ADAMS      2,598,484
BEARING SEAL ASSEMBLY
Filed Oct. 19, 1945      2 SHEETS—SHEET 1

Inventor
Harold E. Adams
By Mosee, Nolte, Crews + Berry
Attorney

Inventor
Harold E. Adams
By Moses, Nolte, Crews + Berry
Attorney

Patented May 27, 1952

2,598,484

UNITED STATES PATENT OFFICE 2,598,484

BEARING SEAL ASSEMBLY

Harold E. Adams, Norwalk, Conn., assignor to Nash Engineering Company, South Norwalk, Conn., a corporation of Connecticut Application October 19, 1945, Serial No. 623,361

19 Claims. (Cl. 103—87)

The present invention relates to a bearing seal assembly, especially of the type adapted for use in connection with the shaft of a rotary liquid pump.

In a common form of fuel booster pump, particularly of the type in which a motor and pump unit is adapted to be submerged in the fuel in a tank, as for example, that employed in an aircraft, the motor is mounted with its axis of rotation extending substantially vertically, and the pump is disposed beneath said motor and is driven from said motor by a long shaft overhanging from a bottom motor ball bearing to the pump impeller. This long extended unsupported shaft is subject to undesirable whip and vibration when operating at the normally high pump speeds of 5,000 to 10,000 R. P. M. If a shaft seal and/or a long explosion-resisting flame retarding passage is provided around and along the shaft, these take up substantial longitudinal space, thereby adding to the length of the shaft.

Also, in the general type of motor and pump unit described, the bottom motor ball bearing has a short life, especially due to the fact that gasoline or other fuel vapors seep up into said ball bearing, and thin out the normal grease lubrication usually provided for such bearings, thereby rendering said lubrication ineffective.

The motor ball bearing has the additional destructive load imposed upon it as a result of the long extended shaft, and the unbalanced forces which inevitably occur in the pump impeller at far end of the shaft, especially when handling non-homogeneous liquids full of foam or bubbles, such as these pumps are required to handle.

One object of the present invention is to provide a new and improved compact pump shaft bearing seal assembly which avoids some or all of the objectionable features above referred to.

In carrying out certain features of the present invention, there is employed instead of the troublesome ball bearing above referred to, a carbon sleeve bearing mounted and arranged to be lubricated by the gasoline or other liquid being pumped.

As another feature, there is provided a shaft seal which also serves as a means of affording a long labyrinthic explosion-resisting path, and also as a slinger to divert leakage from between relatively slidable sealing faces and cast it off radially outwardly from said faces.

As a further feature, there is provided an all metallic seal, including a rotatable metallic bellows which is unaffected by the action of corrosive gasoline and extreme temperature changes.

As another feature, the shaft seal is constructed so as to require minimum of spring pressure urging relatively rotatable sealing faces together. This feature is advantageous, particularly since it reduces the starting torque requirements of the pump motor.

The features of the invention above recited not only have the specific advantages set forth, but also serve conjointly to form a compact construction affording minimum impeller shaft overhang.

Various other objects, features and advantages of the invention will be apparent from the following particular description, and from an inspection of the accompanying drawings, in which.

Figure 1:
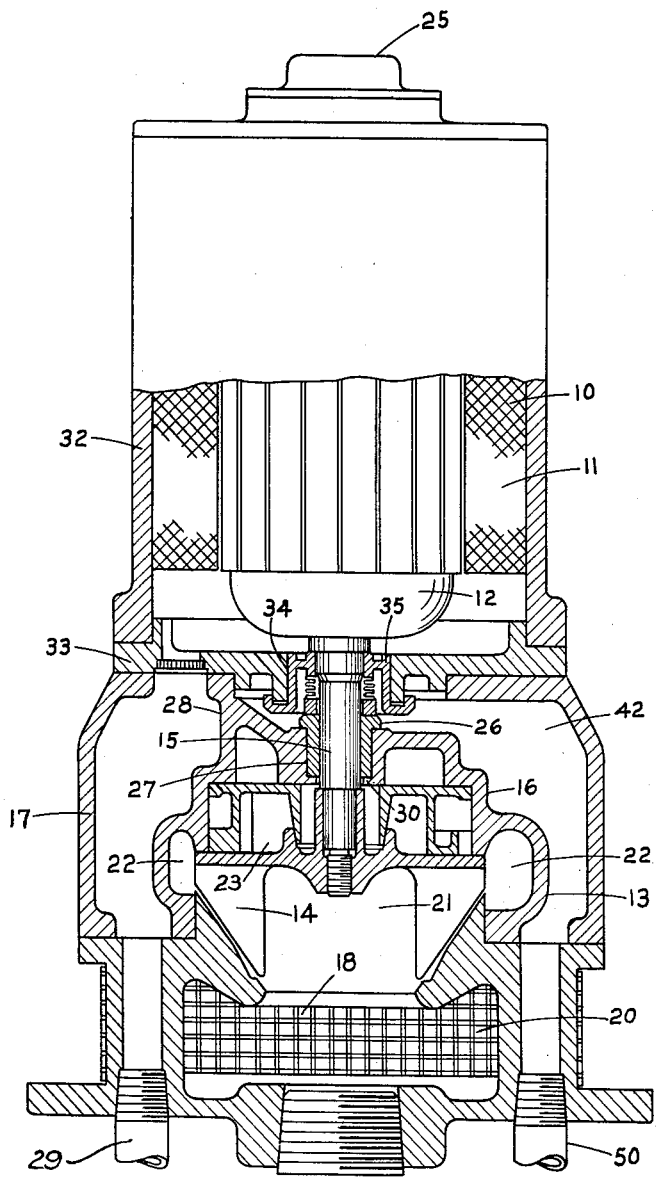
Fig. 1 is a vertical longitudinal section of a submerged type of fuel booster pump embodying the present invention.
Figure 2:
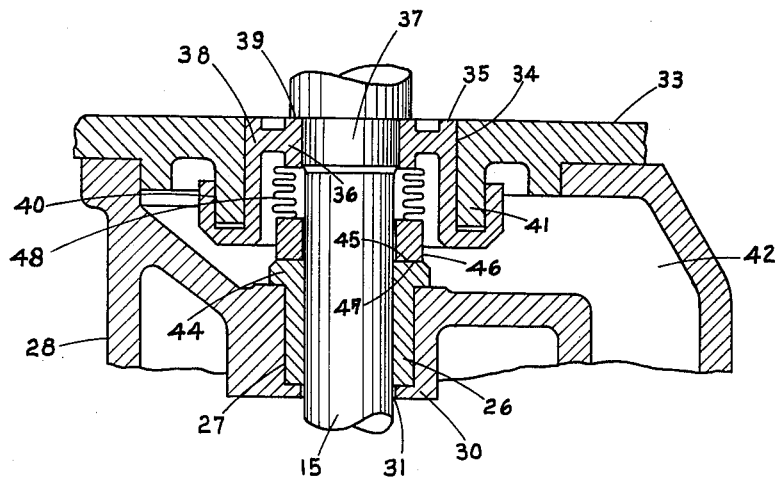
Fig. 2 is an enlarged cross-section of the seal and bearing construction but in a different plane.
Figure 3:
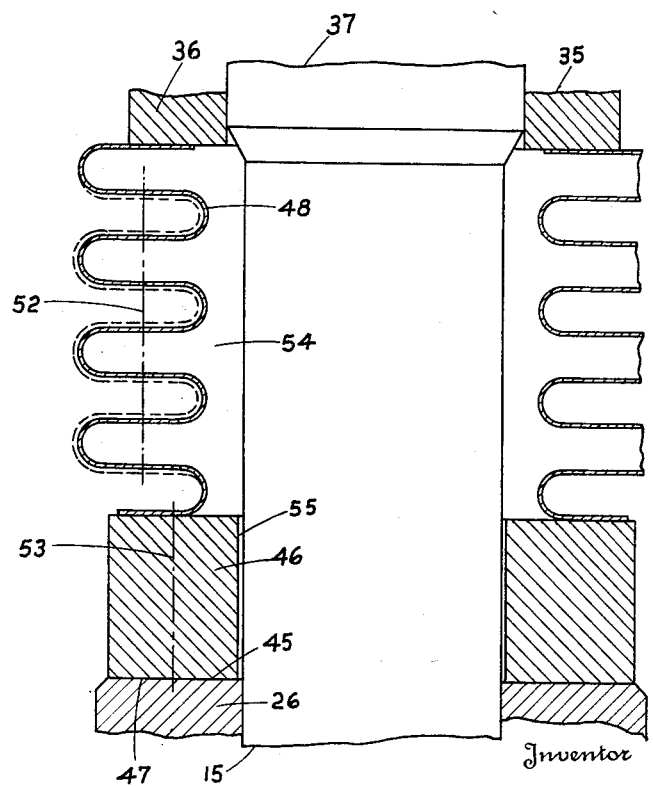
Fig. 3 is an enlarged cross-section of the metallic bellows seal element with associated parts of the seal assembly.

The features of the present invention are illustrated as applied to a submerged type of pump and motor unit, which is adapted to be mounted in a gasoline tank and submerged in the gasoline contained therein. However, as far as certain aspects of the present invention are concerned, these features relating to the seal and bearing construction are also applicable to the external type of pump.

Referring to the drawings, there is shown a motor and pump unit comprising a motor 10, having a stator 11 and a motor armature 12 with its axis extending substantially vertically, and a booster fuel pump 13 driven from and disposed below said motor. This fuel pump 13 comprises a rotor impeller 14 which is affixed to the lower end of a shaft 15 rigid with the motor armature 12, and which is enclosed in a pump casing or bracket 16. The pump 13 is contained within a housing 17 having an inlet 18 protected by a strainer 20 through which the gasoline from the fuel tank passes by gravity in its way to the axial inlet or suction side 21 of the pump impeller 14. The pump casing 16 has a volute chamber 22 through which the fuel is discharged to the main fuel pump (not shown) on the outside of the fuel tank.

The pump is additionally equipped with a water ring gas purging pumping element 23 of the Nash type disposed on the upper part of the impeller 14, as in my copending application Serial No.

493,662, now Patent No. 2,461,865, dated February 15, 1949. The function of this pumping element 23 is to remove vapors from the impeller 14 and discharge them back into the tank.

The motor armature 12 is supported on its upper end by a ball bearing located in a bearing cap 25. The internal race of this ball bearing is secured to the armature shaft, and the external race is secured in the bearing housing, so as to prevent endwise movement of the armature 12 and effectively resist any thrust loads resulting from the weight of the armature, and the rotating parts, including the shaft 15, and resulting also from the thrust forces developed by the pump impeller 14.

The armature 12 is held at its lower end against transverse movement by means of the impeller shaft 15 journalled in a stationary carbon graphite bearing sleeve 26. This bearing sleeve 26 is supported in the cup-shaped hollow 27 of the pump casing wall 28, having at the bottom of said hollow an inwardly extending flange 30 on which said sleeve rests and through which the impeller shaft 15 passes. By means of this arrangement, the impeller 14 is supported by the shaft 15 immediately beyond the carbon bearing 26. Thus, with the coupling of the impeller 14 close to the bearing support 26, the deflection of the shaft 15 beyond said support due to any unbalanced forces occurring in the impeller is reduced to a minimum.

The bearing sleeve supporting flange 30 affords around the shaft 15 an annular clearance space 31 through which the gasoline being pumped may enter. This gasoline seeps upwardly along the interface between the shaft 15 and the bore of the carbon bearing sleeve 26, and thereby effectively lubricates said shaft and said bearing. Liquid which enters the pump inlet or suction side 21 fills all of the interior of casing 16, either by gravity flow when the pump is idle or by the action of the pump when running. This same liquid also flows from the interior of casing 16 through the annular clearance space 31 where it seeps upwardly along the interface between the shaft 15 and the bore of the carbon bearing sleeve 26, and thereby lubricates said shaft and said bearing.

The motor 10 is enclosed in a liquid-tight housing 32, which is separated from the pump housing 17 by a stationary partition or motor end bracket 33 provided with an opening or aperture 34 through which the shaft 15 extends. A pipe connection 29 serves as a vent to atmosphere from the interior of the motor housing, and serves to equalize the pressure in the interior of said housing to the ambient atmosphere to allow the motor chamber to breathe.

A seal assembly is provided for sealably closing the opening 34 around the shaft 15, and for preventing leakage of gasoline into the interior of the motor housing 32 along said shaft. This seal assembly comprises an aperture sealing member 35, serving also as a seal holder, and having an inner cylindrical section 36 pressed with a liquid-tight connection onto the diametrically enlarged portion 37 of the shaft 15 for rotation therewith, and against a shoulder 39 on said shaft, and having also an outer comparatively long cylindrical section or flange 38 concentrically encircling said inner section and turned outwardly at its lower end to form an annular channel 40. The partition or motor end bracket 33 has a cylindrical flange or wall 41 embracing the outer cylindrical section 38 of the seal holder 35 with a snug rotative fit, and extending at its lower end snugly with a rotative fit into the channel 40. By means of this arrangement, there is afforded between the interior of the motor housing 32 and a seal drain chamber 42 in the pump housing 17 a comparatively long labyrinthic junction path which serves to extinguish any flame resulting from an explosion generated in the vicinity of the motor 10, and thereby prevents this flame from reaching the fuel in the tank.

The bearing sleeve 26 is provided at its upper end with a radially outwardly extending flange 44 seated on the pump casing wall 28 and having its upper face 45 flat and highly polished. Encircling the shaft 15 and seated on the face 45 of the bearing sleeve 26 is a rotatable seal nose piece or ring 46. This seal nose piece 46 is made of hardened stainless steel or equivalent material, and has its underface 47 flat and polished to a high mirror finish to form with the bearing sleeve face 45 a liquid-tight slide joint.

Encircling the shaft 15 is a metallic resilient bellows 48 having its lower end soldered or otherwise sealably affixed to the seal nose piece 46, and its upper end soldered or otherwise sealably secured to the inner cylindrical section 36 of the rotatable seal holder 35.

The seal holder 35 also serves as a slinger for diverting leakage from the interface between the rotatable seal nose piece 46 and the stationary bearing sleeve 26, and preventing it from reaching the motor 10. To that end, the seal holder 35 casts the leakage radially outwardly where it is collected in the chamber 42, and is allowed to drain from the bottom of this chamber through drain connection 50 leading to an external point.

It is seen that the member 35 serves not only as an aperture sealing member and a seal holder, but also as a leakage slinger, and as a means for retarding or extinguishing explosion flames, thereby including a number of desirable functions within the same axial space. This permits substantial reduction in the length of the shaft 15, and results thereby in material reduction in the size and weight of said shaft and improvement in performance due to reduction of bending stresses, etc.

The effective radius of the bellows 48 as indicated by the line 52 is greater than the effective radius of the seal faces 45 and 47, as indicated by the line 53. With such an arrangement of areas, any excess pressure within the internal confines 54 of the bellows 48 above the pressure on the outside of the bellows and seal assembly tends to force the rotating seal nose piece 46 in closer contact with the stationary seal face 45 on the bearing sleeve 26.

The seal nose piece 46 has its shaft receiving aperture large enough to form an annular clearance space 55 between said nose piece and the shaft 15. Under normal static conditions, there is always a head of fuel in the tank above the pump, which provides pressure within the bellows 48 through the clearance space 55.

The outside of the seal assembly is normally subjected to atmospheric pressure by its communication with the chamber 42 and the drain connection 50. Thus, under static conditions, the slide surfaces 45 and 47 are held in sealing contact by the normal head of fuel in the tank operating over the differential effective areas of the seal nose piece 46 and the bellows 48, and also by the natural resiliency of the metallic bellows. These forces are moderate as compared to the force required to hold the sealing faces 45 and 47 in engagement when relatively rotating.

By taking advantage of the moderate forces described, to maintain a tight seal during stationary or static conditions, the use of a motor with a high starting torque to start relative slide motion between the seal faces 45 and 47 is not required. A motor with a high starting torque is required in connection with a seal which is provided with a stationary bellows and with a spring having sufficient pressure to overcome the additional pressures required when the shaft is rotating. The pumps and motors of the type contemplated in accordance with the present invention are intended for operation at very high speed and with relatively low horsepower, so that the motors driving these pumps have a low torque. To apply a strong spring to hold the seal faces 45 and 47 together within the limits of the motor torque, while at the same time overcoming pressure differentially to maintain a seal when operating at high speeds, would require considerable additional horsepower on the part of the motor to overcome the friction caused by such a spring. This is particularly true during the transition stage from stationary condition to full speed.

After the pump and motor are started, there is automatic increase in pressure within the seal chamber 54 defined by the bellows 48, due to the fact that the bellows is rotating, and the liquid fuel therein builds up a static pressure from the centrifugal effect of this rotation. This automatically increases the internal pressure which is transmitted through the bellows 48 to the rotating seal nose piece 46, thus exerting additional pressure between the sealing slide faces 45 and 47. This additional pressure is sufficient to overcome unbalance effects in the assembly and other vibration effects that might cause the separation of the rotating seal nose piece 46 from the stationary seal face 45. This additional pressure is only exerted after the motor 10 has reached its full speed, when the motor is in condition to exert easily the required torque to take care of this additional sealing load.

Since the vapor pump 23 serves to remove the vapors from the impeller 14 and discharge them back into the tank, said pump operates at a pressure substantially that of the liquid in the tank itself, and merely creates sufficient differential to remove the gases and direct them back into the tank. The pressure surrounding the hub of this Nash type of liquid ring vapor pump 23 is therefore essentially that of the pressure within the tank itself, and is therefore not sufficient to pressurize the interior of the bellows 48. With the construction of the present invention, the bearing 26 and the interior of the bellows 48 are not subjected to a build-up of the pressure developed by the impeller 14 when the pump is in operation, so as to minimize the pressure exerted by the bellows upon the seal faces 45 and 47 when in operation, and thereby prevent undue friction and excessive wear between these surfaces. The sealing arrangement of the present invention is particularly adaptable to high speed low powered motors. Because of the low torque exerted by such motors, and because of the necessity of accomplishing a minimum of waste in power, especially in aircraft applications, it is essential that the drag created by the sealing ring 46 be kept at a minimum. By means of the present invention, the additional pressure that can be built up by the seal assembly is limited to the pressure built up within the seal itself by the liquid trapped therein when rotation is initiated.

As many changes can be made in the above apparatus, and many apparently widely different embodiments of this invention can be made without departing from the scope of the claims, it is intended that all matter contained in the above description or shown in the accompanying drawings shall be interpreted as illustrative and not a limiting sense.

What is claimed is:

1. A rotary unit type dual purpose shaft seal for a shaft passing through a pair of openings in a pair of walls respectively spaced to define a space therebetween, comprising a member near one end of said seal having an inner substantially cylindrical section adapted to embrace said shaft in the opening of one of said walls and to be secured thereto for rotation therewith, and a longer substantially cylindrical outer flange encircling said inner section and having a journal connection with said latter wall, said outer flange having an end radial extension to form with the latter wall a labyrinthic seal against flame propagation from one side of said latter wall into said space, a member near the other end of said seal adapted to bear against the end face of a shaft bearing in the opening of the other wall to form a seal against leakage of liquid from one side of said other wall into said space, and a collapsible annular element in said space connected at its ends to said inner cylindrical section and said latter member respectively and adapted to encircle said shaft, said collapsible element being adapted to rotate with said shaft and being housed within said outer flange.

2. A rotary unit type dual purpose shaft seal for a shaft as described in claim 1, in which said collapsible annular element is a metallic resilient bellows.

3. A rotary unit type shaft seal for a shaft passing through two openings of two spaced walls respectively, comprising a member having an inner annular section adapted to embrace the shaft and to be rotated therewith in the opening of one of said walls and having an outer annular flange extending radially outwardly from said inner section and encircling said inner section, said outer flange having a radially outwardly extending portion at one end to form with the latter wall a leakage slinger, said outer flange portion having a winding conformation to form with the latter wall a flame barrier, a seal ring adapted to bear against an annular stationary surface adjacent to the opening of the other wall to form therewith a seal against the escape of liquid through the opening of said other wall into the space between said walls, and a collapsible annular element connected to and extending between said inner annular section and said seal ring and adapted to encircle said shaft, said collapsible annular element being housed within said annular flange.

4. A rotary unit type dual purpose shaft seal for a shaft passing through two openings of two spaced walls respectively, comprising a member sealing the opening of one of said walls and having an inner annular section near one end adapted to embrace the shaft and to be rotatable therewith, and an outer annular section spaced radially outwardly from said inner annular section and turned at one end to form an annular channel for the reception of the portion of the latter wall bordering its opening and to form thereby with the latter wall a flame barring connection, a seal ring located near the other end of said member and adapted to bear against an annular stationary sealing face of a bearing for the shaft in the opening of the other wall to form a liquid running seal with said face against the escape of liquid through the opening of said other wall into the space between said walls, and a collapsible sealing sleeve element adapted to sealably encircle said shaft and interconnecting said inner annular section and said seal ring, said collapsible annular element being housed within said outer annular section.

5. In a close coupled, explosive-proof electric motor driven rotary fuel pump having a wall forming part of the motor housing, another wall forming part of the pump housing and separated from said motor housing wall by a space and a shaft between the motor and the pump passing through openings in said walls respectively and supported in a bearing sleeve located in said pump housing wall and presenting a surface at the end of said sleeve nearest said motor housing, a unit type dual purpose shaft seal having a part forming with said motor housing wall a labyrinthic seal against flame propagation from the interior of the motor housing through the opening of said motor housing wall and into said space, and another part of said seal cooperating with said end surface of said bearing sleeve to form therewith a seal against leakage of fuel from the pump through the opening in the pump housing wall and to said space.

6. In a close coupled, explosive-proof, electric motor driven rotary fuel pump having a wall forming part of the motor housing, another wall forming part of the pump housing and separated from said motor housing wall by a space and a shaft between the motor and the pump passing through openings in said walls respectively and supported in a bearing sleeve in said pump housing wall, a unit type dual purpose shaft seal having an inner annular section near one end in the opening of the motor housing wall embracing the shaft and secured thereto for rotation therewith and an outer annular section in the opening of the motor housing wall spaced radially outwardly from said inner annular section and having a labyrinthic journal connection with said motor housing wall forming a seal against the propagation of a flame from the motor housing through the opening in said motor housing wall and into said space, said seal having near its other end a seal ring bearing against an annular sealing face on said bearing sleeve, and an annular sealing member in said space sealably connected at its ends to said inner annular section and said seal ring and sealably enclosing said shaft between said inner annular section and said seal ring.

7. In a close coupled, explosive-proof, electric motor driven rotary fuel pump having a wall forming part of the motor housing and provided with a circular opening and a substantially cylindrical flange bordering said opening and presenting an annular edge section, another wall forming part of the pump housing and separated from said motor housing wall by a space, said other wall having an opening in alignment with said first-mentioned opening, and a shaft between the motor and the pump passing through said openings and supported in a bearing sleeve in said pump housing wall, a unit type dual purpose shaft seal having an inner annular section near one end in the opening of the motor housing wall embracing the shaft and secured thereto for rotation therewith and an outer annular section in the opening of the motor housing wall spaced radially outwardly from said inner annular section and journalled in said wall flange, said outer annular section having a radially and outwardly projecting annular channel extension receiving snugly the edge section of said wall flange, whereby said outer annular section has a labyrinthic journal connection with said wall flange forming a seal against the propagation of a flame from the motor housing wall through the opening in said motor housing wall and into said space, said seal having near its other end a seal ring bearing against an annular sealing face on said bearing sleeve, and an annular sealing member in said space sealably connected at its ends to said inner annular section and said seal ring and sealably enclosing said shaft between said inner annular section and said seal ring.

8. In a booster pump and motor unit of the fuel submerged type, comprising a motor having an armature and a bearing by which said armature is supported, a housing for said motor, a pump having a shaft rigid with said armature, and a housing for said pump, the combination comprising a stationary partition separating the two housings and having an opening through which said shaft extends, and a bearing seal assembly for said shaft comprising a sealing member between said shaft and the periphery of said opening mounted for rotation with said shaft, and having an annular outer surface and an end section reversely turned to form an annular channel, said partition having an annular section embracing said outer surface with a snug rotative fit, and extending at one end into said channel with a snug rotative fit to form a labyrinthic seal barring flame propagation from said motor housing towards said pump housing, means for supporting said shaft including a bearing sleeve on the side of said partition opposite said motor housing, a seal ring located between said bearing sleeve and said partition and encircling said shaft, said seal ring being seated with a sealing fit against said bearing sleeve to prevent lateral leakage of fuel outwardly from the inside of said bearing sleeve and a metallic resilient bellows encircling said shaft, and having one end sealably connected to said ring and its other end sealably connected to said sealing member, said seal ring defining an annular clearance space around said shaft through which the fuel enters into the interior of said bellows, whereby when said bellows is rotating, the fuel in said bellows is under centrifugal pressure which increases the internal pressure of the fuel in said bellows and which increases thereby the pressure of said seal ring against said bearing sleeve causing said seal ring to be urged against said bearing sleeve.

9. In combination, a shaft, a rotary liquid pump driven from said shaft, a bearing sleeve for said shaft having a smooth stationary sealing face at one end, said bearing sleeve and said shaft defining therebetween an annular junction presenting bearing surfaces therealong, a rotatable seal member comprising a metallic resilient bellows encircling said shaft on the side of said sleeve nearest said sleeve end and rotatable with said shaft, a nose seal ring connected to the end of said bellows nearest said sleeve end and seating upon said stationary sealing face, said ring defining an annular clearance space with said shaft, a pump casing wall supporting said bearing sleeve and affording an annular clearance around said shaft at the other end of said sleeve, whereby said other sleeve end is in communication with the liquid from said pump and liquid is caused to seep from said other sleeve end along said annular junction, to lubricate thereby the bearing surfaces along said annular junction and to flow through the annular clearance between said seal ring and said shaft into said bellows, the liquid in said bellows upon rotation creating sufficient centrifugal pressure to increase the internal pressure of the liquid in said bellows and to urge thereby said seal ring against said stationary sealing face with pressure varying according to the rotational speed of said bellows.

10. The combination as described in claim 9, said bellows through its inherent resiliency urging said seal ring axially lightly against said sealing face to form a liquid leak-tight joint when the shaft is stationary, the effective radius of said bellows being greater than the effective radius of the seal faces between said seal ring and said bearing sleeve, whereby said liquid in said bellows during shaft running operations causes by centrifugal force additional pressure to be exerted axially by said bellows and urges thereby said ring axially into greater pressing engagement with said sealing face.

HAROLD E. ADAMS.

REFERENCES CITED

The following references are of record in the file of this patent:

UNITED STATES PATENTS

| Number | Name | Date |
| --- | --- | --- |
| 1,239,869 | Block | Sept. 11, 1917 |
| 1,704,258 | Morgan | Mar. 5, 1929 |
| 1,850,749 | Frederick | Mar. 22, 1932 |
| 1,851,075 | Ackerman | Mar. 29, 1932 |
| 1,866,967 | Durham | July 12, 1932 |
| 1,931,724 | Fageol et al. | Oct. 24, 1933 |
| 1,937,461 | Mylting | Nov. 28, 1933 |
| 1,976,532 | Wilfley | Oct. 9, 1934 |
| 2,108,701 | Amberg | Feb. 15, 1938 |
| 2,152,727 | Baumheckel | Apr. 4, 1939 |
| 2,207,183 | Thrush | July 9, 1940 |
| 2,243,208 | Hawley, Jr. | May 27, 1941 |
| 2,244,450 | Erni | June 3, 1941 |
| 2,249,930 | Bailey | July 22, 1941 |
| 2,251,219 | Brummer | July 29, 1941 |
| 2,290,813 | Ploeger | July 21, 1942 |
| 2,312,526 | Curtis | Mar. 2, 1943 |
| 2,363,420 | Howard | Nov. 21, 1944 |
| 2,382,960 | Compton et al. | Aug. 21, 1945 |

FOREIGN PATENTS

| Number | Country | Date |
| --- | --- | --- |
| 300,501 | Germany | 1917 |
| 478,380 | Germany | 1929 |
| 664,854 | France | 1929 |